(12) United States Patent
Kajino (10) Patent No.: US 6,957,670 B1
(45) Date of Patent: Oct. 25, 2005

(54) DUCT UNIT FOR AIR-CONDITIONER

(75) Inventor: Isamu Kajino, Saitama (JP)

(73) Assignee: Fuji Kuuchou Kougyou Co., Ltd., Saitama (JP)

( * ) Notice: Subject to any disclaimer, the term of this patent is extended or adjusted under 35 U.S.C. 154(b) by 0 days.

(21) Appl. No.: 10/507,778

(22) PCT Filed: Mar. 31, 2003

(86) PCT No.: PCT/JP03/04094

§ 371 (c)(1),
(2), (4) Date: Apr. 29, 2005

(87) PCT Pub. No.: WO03/083378

PCT Pub. Date: Sep. 10, 2003

(30) Foreign Application Priority Data

Apr. 1, 2002 (JP) .............................. 2002-098449
Mar. 19, 2003 (JP) .............................. 2003-075903

(51) Int. Cl.[7] .............................. F16L 9/00; F24F 13/02
(52) U.S. Cl. ................. 138/157; 138/119; 138/DIG. 4; 138/158; 138/155
(58) Field of Search .................. 138/119, 120, 155, 138/157, 1, 159, 162, 163, DIG. 4

(56) References Cited

U.S. PATENT DOCUMENTS 789,315 A  *  5/1905  Bergsttrom .................. 138/119
3,818,948 A  *  6/1974  Hedges ........................ 138/119
3,861,423 A  *  1/1975  Hedges ........................ 138/119

FOREIGN PATENT DOCUMENTS

| JP | 59038542 A | * | 3/1984 | ........... F24F 13/02 |
| JP | 2002193365 A | * | 7/2002 | ........... B65D 85/00 |
| JP | 2003114044 A | * | 4/2003 | ........... F24F 13/02 |
| JP | 2005098626 A | * | 4/2005 | ........... F24F 13/02 |

* cited by examiner

*Primary Examiner*—Patrick Brinson
(74) *Attorney, Agent, or Firm*—Arent Fox PLLC (57) ABSTRACT

An object of the present invention is to provide an air-conditioning duct unit capable of being made compact when transported to largely reduce the cost of transport inside and outside a building as well as the cost of transportation by a truck.

A duct unit A of the present invention has upper and lower wall portions 1 and 3 and right and left wall portions 2 and 4 formed of metal sheets, and spin locks curved into a curled shape, the spin locks being provided on the wall portions 1 to 4 at two side edges of the same along the longitudinal direction. One of the pair of spin locks provided on each adjacent pair of the wall portions is inserted in the other to form one of lock joints 9-1 to 9-4 rotatably. The wall portions 1 to 4 are linked so that the duct unit A can be changed in shape. Consequently, the duct unit can be folded so as to be flattened.

10 Claims, 8 Drawing Sheets

DUCT UNIT FOR AIR-CONDITIONER

CROSS-REFERENCE TO RELATED APPLICATION

This application is a National Stage entry of International Application No. PCT/JP03/04094 filed Mar. 31, 2003. The disclosure of the prior application is hereby incorporated herein in its entirety by reference.

TECHNICAL FIELD

The present invention relates to an air-conditioning duct unit formed in such a manner that flanges provided in end surfaces are connected to each other. More particularly, the present invention relates to an air-conditioning duct unit capable of being transported in a flattened state to a workplace.

BACKGROUND ART

In most cases, an air-conditioning duct is installed in the ceiling or under the floor of a building by connecting a plurality of duct units to a necessary length. Air-conditioning ducts have a rectangular shape or a circular shape. A duct in rectangular shape is generally called a rectangular duct and has, in principle, button-punch snap locks or Pittsburgh locks in at least two places. For connection of rectangular ducts, an angle connection method or a tee duct connection (TDC) method is used. In the angle connection method, flanges are formed from steel angle members and are rivetted to duct bodies, and the entire peripheral flanges are connected by bolts and nuts. In the tee duct connection method, tee duct connector flanges are made by forming metal sheets metal, corner pieces are attached to the tee duct connector flanges at the time of assembly, and the tee duct connector flanges are connected by bolt and nuts at the four corners and special flange retaining metal fittings (clamps or the like).

Conventional duct units have a blank thickness of 0.4 to 1.6 mm after a preservative treatment and have a longer side length of ordinarily 2000 mm or less, and a width in the range from 150 to 3000 mm. Metal sheets with connection flanges are assembled into a tubular shape in a factory in advance to form such duct units, and the duct units are transported to a workplace by container transportation using a truck with care not to deform the duct units.

In ordinary cases, the length of the longer side of such duct units is not larger than the width of the blank metal sheet because its maximum value is ordinarily limited to the width of a metal sheet roll. On the other hand, the duct units are designed so that the width in the transverse direction is set to a value in the above-mentioned range according to the ventilation amount. In the case of large duct units, therefore, the number of duct units a truck can carry is only a limited part of the total number of duct units. In such a case, the transportation efficiency is considerably low and the cost of transportation of duct units is large. Moreover, the amount of carbon dioxide exhaust considered a main cause of global warming is not negligible due to considerably low energy efficiency. In construction of high-rise buildings increasing in number recently, a substantial space is required for carrying-in of duct units, a substantially long time is required for lifting, and the cost of transport inside and outside the buildings are large.

Therefore, an object of the present invention to provide, as a solution to the above-described problem, an air-conditioning duct unit which can be made compact during transportation to effectively reduce the costs required for truck transportation and transport inside and outside a building and to contribute to a reduction in the amount of carbon dioxide exhaust.

DISCLOSURE OF INVENTION

An air-conditioning duct unit of the present invention provided to achieve the above-described object is characterized by having upper and lower wall portions and right and left wall portions formed of metal sheets, and characterized in that spin locks curved into a curled shape are provided on the four wall portions at two side edges of the wall portions along the longitudinal direction; the spin locks provided on each of the adjacent pairs of the wall portions are joined to each other to form a rotatable lock joint; and the entire duct unit can be changed in shape by the rotation of the spin locks to be flattened.

In the air-conditioning duct unit thus characterized, the four wall portions are linked to each other with each lock joint forming an axis of rotation. Therefore, the duct unit can be folded into a flattened state. The capacity of the duct unit is thereby reduced largely. Consequently, the duct unit can be transported after being made compact. Also, the duct stock space in a workplace can be reduced to ⅕ to ⅓ of that in the case of the conventional art, thus securing a sufficient workspace. Further, a multi-skill worker as well as a skilled worker can easily return the duct unit from the flattened state to the state in the form of a tube having a predetermined rectangular sectional shape.

A mode of implementation of the present invention as set forth in the claims and the operation in the mode of implementation will be described.

In the mode of implementation of the present invention, connection flanges are formed on the wall portions with the connection flanges being perpendicularly bent from two side edges of the wall portions along the shorter-side direction. An adjacent pair of the ducts can be easily connected to each other by superposing the connection flanges of the ducts on each other. In a tee duct connection method, the connection flanges are fastened to each other with bolts, and nuts and flange retaining metal fittings at four corners to improve the strength of the air-conditioning duct.

In another mode of implementation of the present invention, in a case where a flat portion is formed in each spin lock along the side of the wall portion, the curved portion in the curled form is placed inside or outside the flat portion to enable the curved portion to be reduced in radius of curvature. The diameter of the lock joint can be correspondingly reduced, so that the duct unit becomes compact when folded into the flattened state.

In still another mode of implementation of the present invention, it is preferable to fit a cylindrical hollow gasket in the lock joint in the axial direction. If such a gasket is provided, the airtightness between the lock joint end surfaces in the air-conditioning duct after connection of the duct units is improved.

In yet another mode of implementation of the present invention, it is preferable to attach a reinforcing flange to an intermediate portion of the outer peripheral surface of each of the wall portions in the longitudinal direction. If such a reinforcing flange is provided, it is possible to prevent deformation of the wall portions even when the strength of the lock joints is low. Moreover, the length of the duct unit can be increased in comparison with the duct unit without the reinforcing flange in addition to using a relatively thin duct unit.

In a further mode of implementation of the present invention, it is preferred that each of the pair of the upper and lower wall portions and the pair of the right and left wall portions be formed of members identical in size to each other and forming a symmetrical structure. If these wall members are identical in specifications, one wall member can be used as each of the upper and lower wall portions and another wall member can be used as each of the right and left wall portions, thereby improving the facility with which duct unit assembly operations are performed.

BEST MODE FOR CARRYING OUT THE INVENTION

The present invention will be described below in detail with reference to the drawings.

Figure 1:
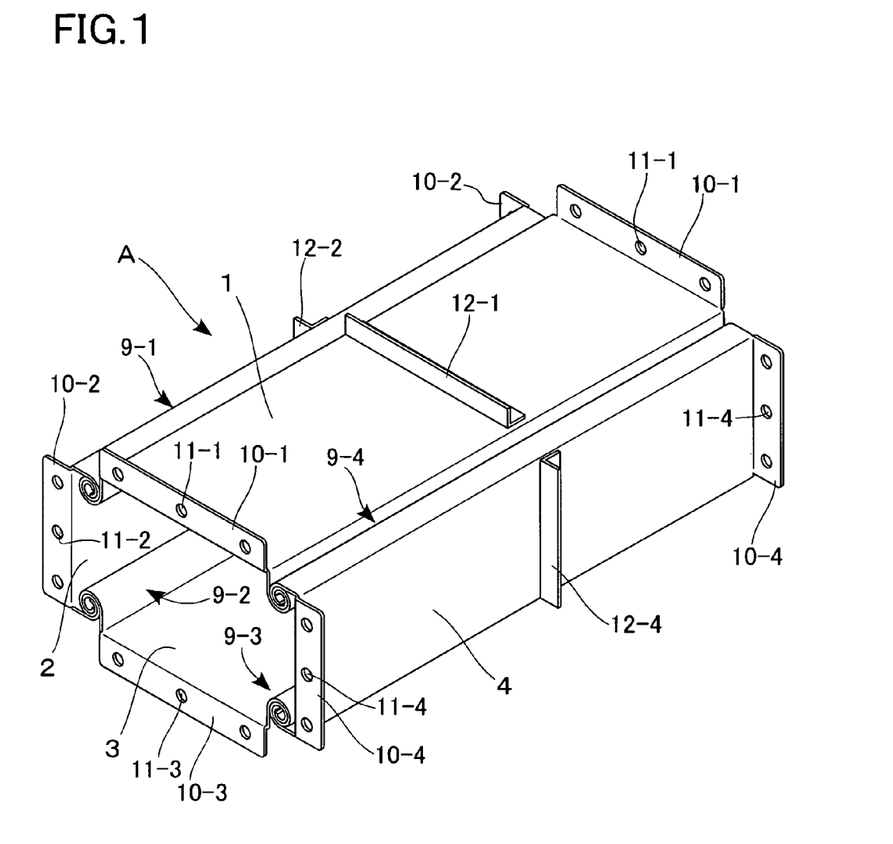
FIG. 1 is a perspective view of an air-conditioning duct unit which represents an embodiment of the present invention.
Figure 2:
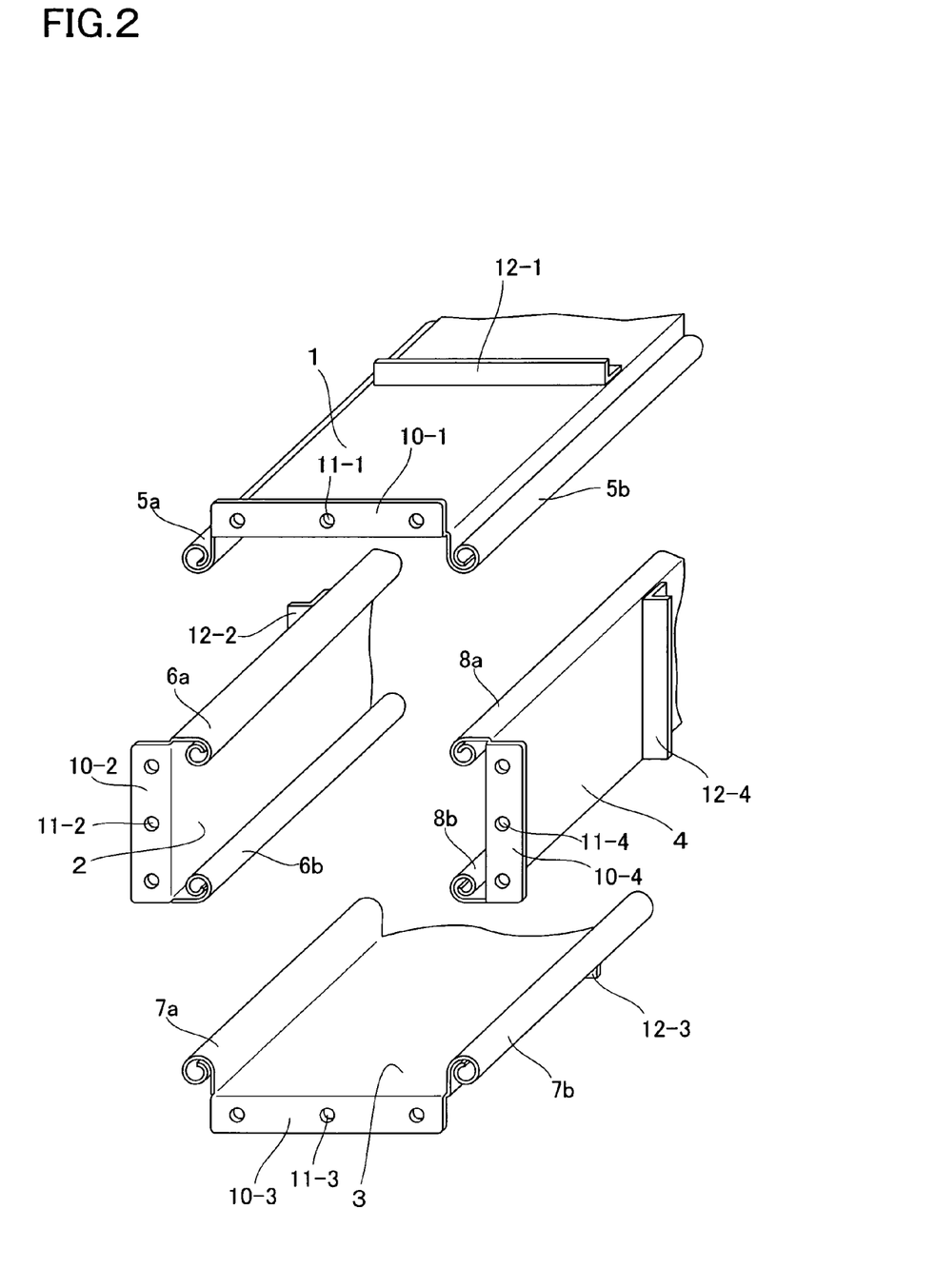
FIG. 2 is an exploded perspective view corresponding to FIG. 1.

In FIGS. 1 and 2, a reference symbol A denotes an air-conditioning duct unit which is rectangular in section, and which is formed by four metal sheets processed by a preservative treatment: an upper wall portion 1, a left wall portion 2, a lower wall portion 3 and a right wall portion 4. Spin locks 5 to 8 formed by being curved into a curled shape are provided on the wall portions 1 to 4 at two side edges of the same along the longitudinal direction.

The spin locks 5 to 8 respectively have small-width flat portions perpendicularly bent from the planer portions in the wall portions 1 to 4, and curved portions having a curled shape, the curved portions being formed continuously from the small-width flat portions. It is preferred that the spin locks 5 to 8 have flat portions. However, if the radius of curvature of the curved portions is large, the formation of the flat portions is not necessarily required. The spin locks 5a, 5b, 7a, and 7b provided along the upper and lower wall portions 1 and 3 are outwardly bent, while the spin locks 6a, 6b, 8a, and 8b provided along the right and left wall portions 2 and 4 are inwardly bent. Each of the pair of spin locks 5 and 7 and the pair of spin locks 6 and 8 formed along the upper and lower wall portions and right and left wall portions may be bent either outwardly or inwardly.

In the duct unit A, one of the curved portions in each of the adjacent pairs of spin locks 5 to 8 along the wall portions 1 to 4 is inserted in the other by being slid along the same, thereby forming a lock joint 9. FIG. 1 shows an example of forming lock joints 9-1, 9-2, 9-3, and 9-4 by respectively joining together the spin locks 5a, 7a, 7b, and 5b outwardly bent and the spin locks 6a, 6b, 8b, and 8a inwardly bent. The lock joints 9 thus formed are rotatable on surface contacts between the curved portions of the adjacent pairs of spin locks 5 to 8. That is, the wall portions 1 to 4 are linked one to another with the lock joints 9 forming axes of rotation so that the connection angle can be freely set.

In a case where the spin locks 5 and 7 (and 6 and 8) formed along at least one of the pair of upper and lower wall portions 1 and 3 and the pair of right and left wall portions 2 and 4 are outwardly bent, the lock joints 9 are formed outside the wall portions. In this manner, a duct cross section can be obtained which is defined by adding the outside diameter of the lock joints 9 to the width of at least one of the pair of upper and lower wall portions 1 and 3 and the pair of right and left wall portions 2 and 4, and the duct diameter can be correspondingly increased.

In order to prevent the spin locks from being disengaged from each other in the lock joints 9, it is necessary to curve each spin locks 5 to 8 at least through such an angle that the curved portion forms a superior arc and one spin lock has an overlapping portion on the other spin lock in the joint. In this respect, it is preferable to form the curved portions of the spin blocks 5 to 8 by curving generally through an angle from a superior-arc angle of 270° to one full turn and a half, more preferably through an angle from a superior-arc angle of 270° to one full turn. It is also preferable to crush opposite end portions after joining of the spin locks 5 to 8. While it is preferable to minimize the gap between the spin locks in the lock joints 9, it is desirable to set the gap to such a small value that one of the spin locks in each pair can be easily inserted in the other.

Connection flanges 10-1 to 10-4 bent perpendicularly outwardly are formed on the wall portions 1 to 4 at two side edges of the same along the shorter-side direction. It is preferable to form at least one bolt insertion hole in each connection flange 10 as one of bolt insertion holes 11-1 to 11-4. In this embodiment, three bolt insertion holes are formed as one of bolt insertion holes 11-1 to 11-4 at equal intervals in the longitudinal direction of each connection flange 10.

Preferably, the duct unit A of the present invention further has reinforcing flanges 12-1 to 12-4 attached to intermediate portions of the outer peripheral surfaces of the wall portions 1 to 4, the reinforcing flanges 12-1 to 12-4 being formed of angle members. If the reinforcing flanges 12-1 to 12-4 are provided, it is possible to reduce the thickness of the duct unit A and to increase the length of the duct unit A in the longitudinal direction as desired. The reinforcing flanges 12-1 to 12-4 have the function of preventing deformation of the wall portions 1 to 4 even if the strength of the lock joints 9 is somewhat smaller. In particular, when thin duct unit A is used, it is desirable to connect adjacent opposite end portions of the reinforcing flanges by L-shaped metal fittings.

Figure 3:
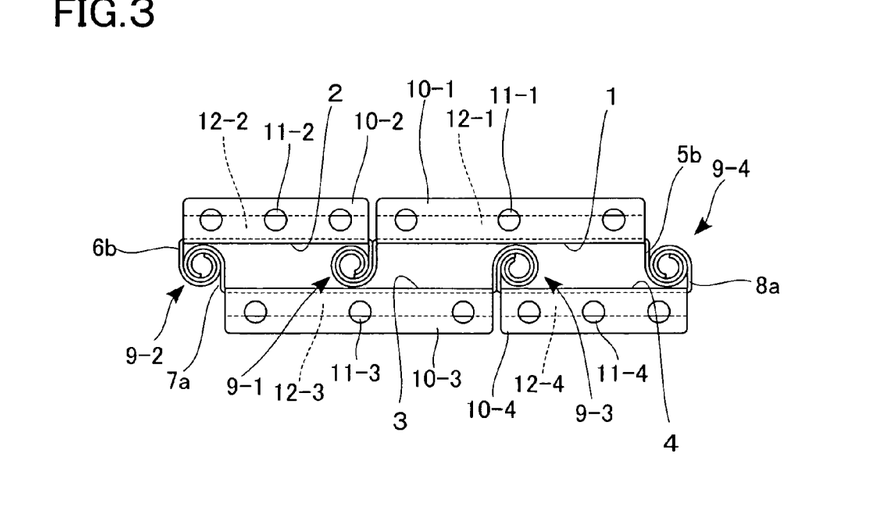
FIG. 3 is a front view of a state in which the duct unit shown in FIG. 1 is changed in shape so as to be flattened.

In the present invention, the air-conditioning duct unit A is changed in shape by being folded on the rotating axes in the lock joints 9 to become flat as shown in FIG. 3 when transported by a truck and when transported inside and outside a building. In this manner, the capacity of the duct unit A can be used to ⅕ to ⅓ to effectively reduce the truck transportation cost and the cost of transport inside and outside a building. Moreover, the duct stocking space can be saved and the duct unit A can be easily carried.

Figure 4A:
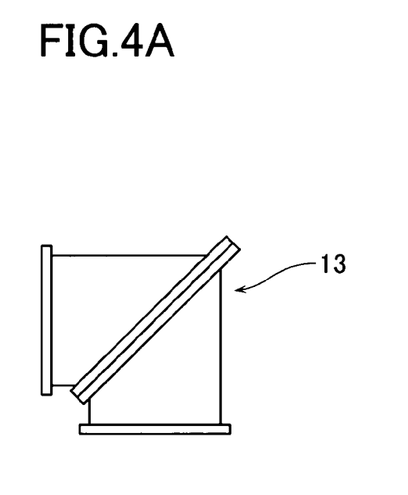
FIGS. 4(A), 4(B), and 4(C) are side views showing examples of other duct units used when the air-conditioning duct unit of the present invention is connected, FIGS. 4(A) and 4(B) showing elbow-type duct units, FIG. 4(C) showing an S-tube duct unit.
Figure 4B:
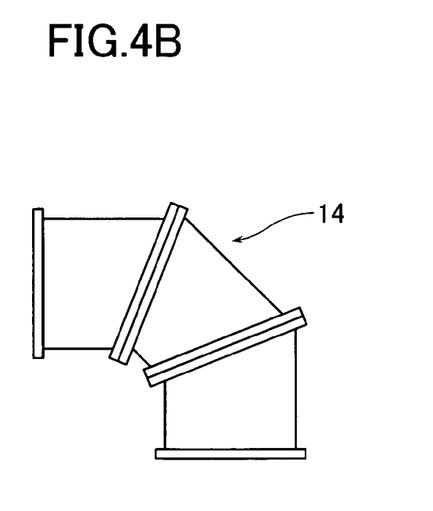
Figure 4C:
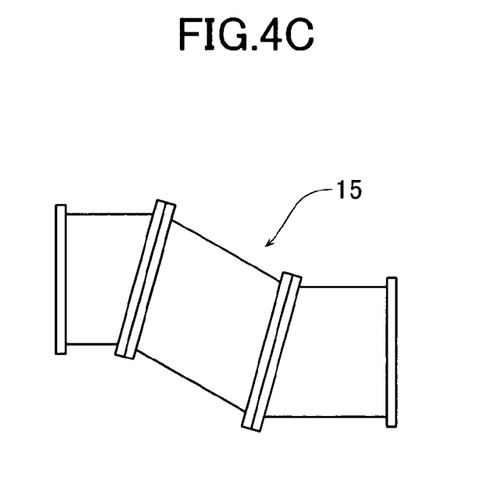

In a workplace, duct units A are returned to the state in the form of a rectangular tube. Thereafter, the connection flanges 10-1 to 10-4 of each adjacent pair of duct units A are superposed on each other, with a sealing member interposed therebetween if necessary. Bolts are passed through the bolt insertion holes 11 and the connection flanges 10-1 to 10-4 and fastening using nuts is performed to connect the duct units A. This connecting operation is repeated to form an air-conditioning duct of a predetermined length. In a place where an air-conditioning duct is installed, a perpendicularly bent portion, a step and a slanted portion are ordinarily included in the duct as well as a straight portion. A right-angle elbow 13 shown in (A) of FIG. 4 and an elbow 14 bent through 45° as shown in (B) of FIG. 4 and an S-tube duct unit 15 as shown in (C) of FIG. 4 are respectively used in such portions.

It is preferable to seal the connecting portions of the duct units A after assembly of the duct units A in order to ensure airtightness of the air-conditioning duct. For example, the entire air-conditioning duct can be made airtight in such a manner that a flat rectangular gasket is pinched between the connection flanges 10, 10 of each adjacent pairs of duct units A, A; L-shaped metal fittings are fitted to adjacent end portions of the connection flanges 10 on opposite sides; bolts are passed through bolt insertion holes formed in corner portions of the L-shaped metal fittings; and the L-shaped metal and the same fastening using nuts as that described above is performed.

In the present invention, the provision of the above-described bolt insertion holes 11 and reinforcing flanges 12 are not necessary required. If no bolt insertion holes 11 are formed, each adjacent pair of connection flanges 10 are fixed to each other by spot welding or by using the above-described L-shaped metal fittings, rivets, clamps or the like. If no reinforcing flanges 12 are attached, it is desirable to use comparatively thick wall portions 1 to 4.

It is preferred that each of the pair of upper and lower wall portions 1 and 2 and the pair of right and left wall portions 3 and 4 including the spin locks and connection flanges be formed of members identical in size and structure to each other. If the upper and lower wall portions 1 and 3 and the right and left wall portions 2 and 4 are made as members identical in specifications, there is no need for distinction between the upper and lower wall members and between the right and left wall members. Therefore, it is advantageous to provide such members in terms of manufacturing cost, inventory control and duct unit A assembly operations. If each of the pair of upper and lower wall portions 1 and 3 and the pair of right and left wall portions 2 and 4 are provided in an asymmetrical structure in a case where the reinforcing flanges 12 are attached to the wall portions 1 to 4, an L-shaped metal fitting may be used as each reinforcing flange 12.

Another air-conditioning duct unit of the present invention connected one to another by the tee duct connection (TDC) method will next be described. Detailed description will be made mainly of points of difference from the duct unit shown in FIGS. 1 to 3. The same components as those described above or the components having the same functions as those described above are indicated by the same reference characters.

Figure 5:
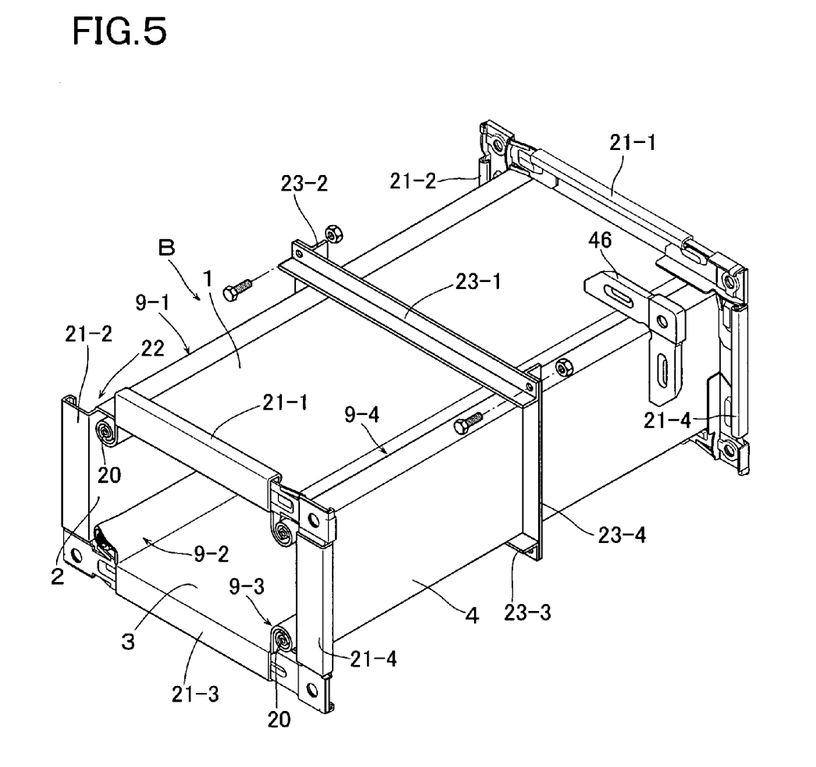
FIG. 5 is a perspective view of an air-conditioning duct unit which represents another embodiment of the present invention in a state where an upper-left-corner corner metal fitting is not attached at an upper left corner.
Figure 7:
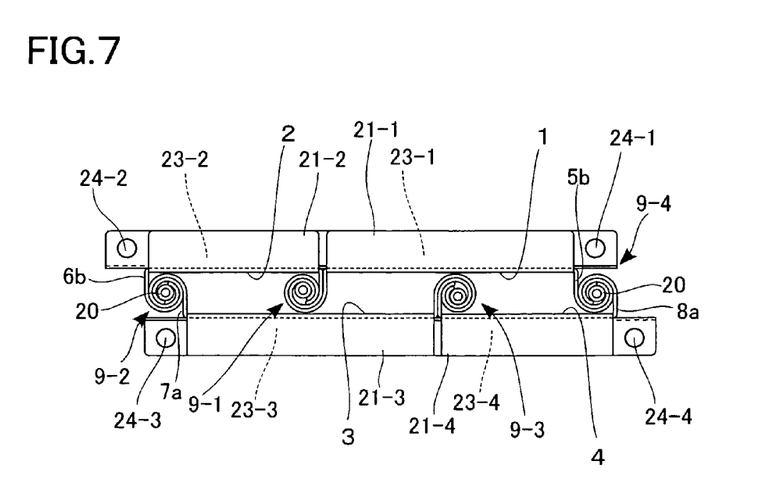
FIG. 7 is a front view of a state in which the duct unit shown in FIG. 5 is changed in shape so as to be flattened.

In FIGS. 5 and 7, a reference symbol B denotes an air-conditioning duct unit which is rectangular in section, and which is formed by four metal sheets: upper and lower wall portions 1 and 3 and right and left wall portions 2 and 4. Spin locks 5 to 8 formed by being curved into a curled shape are provided on the wall portions 1 to 4 at two side edges of the same along the longitudinal direction. The spin locks 5 to 8 respectively have small-width flat portions perpendicularly bent from the planer portions in the wall portions 1 to 4, and curved portions having a curled shape, the curved portions being formed continuously from the small-width flat portions. The spin locks 5a, 5b, 7a, and 7b are formed through the entire length of the two side edges of the upper and lower wall portions 1 and 3. The spin locks 6a, 6b, 8a, and 8b are formed so that their opposite ends and opposite ends of the two side edges of the right and left wall portions 2 and 4 are spaced apart from each other by a small distance.

In the duct unit B, the curved portions of the spin locks 6 and 8 are inserted in the curved portions of the adjacent spin locks 5 and 7 by being slid to form rotatable lock joints 9-1, 9-2, 9-3, and 9-4. Thus, the wall portions 1 to 4 are linked one to another with the lock joints 9 forming axes of rotation.

To prevent leakage of air-conditioning air through the lock joints 9, a cylindrical hollow gasket 20 made of rubber is fitted in the axial direction in each lock joint 9. The hollow gasket 20 may be fitted in only opposite end portions of the lock joint 9 or through the entire length of the lock joint 9. Occurrence of non-uniformity of the sealing effect is prevented by fitting the hollow gasket 20 in each lock joint 9 in the axial direction. A sealing material may be externally applied between the curved portions of each pair of two spin locks jointed to each other. However, this application method is not preferable because nonuniformity of the sealing effect may result depending on the operator's skill.

After fitting the gasket 20, opposite end portions of each lock joint 9 are crushed to prevent the spin locks from coming off the lock joint 9. In FIG. 5 is illustrated a state in which only one end portions of the lock joint 9-2 is crushed.

Connection flanges 21-1 to 21-4 bent perpendicularly outwardly are formed on the wall portions 1 to 4 at two side edges of the same along the shorter-side direction. The spin locks 5 and 7 are outwardly bent and the spin locks 6 and 8 are inwardly bent, as are those in the duct unit A. Therefore, cut corners 22 where no flange portions exist are formed at four corners between adjacent pairs of the connection flanges 21, 21 of the wall portions 1 to 4. Each flange is further bent perpendicularly to have a side projection facing the corresponding one of the wall portions 1 to 4. This side projection has a bent portion inwardly bent along the longitudinal direction. First and second metal fittings described below are attached to opposite end portions of the connection flanges 21 from the cut corners 22 in order to increase the strength of the connection flanges 21. FIG. 5 shows the cut corner 22 at the upper left corner on the front side of the duct unit B. Needless to say, the first and second metal fittings are attached in this place.

Figure 6:
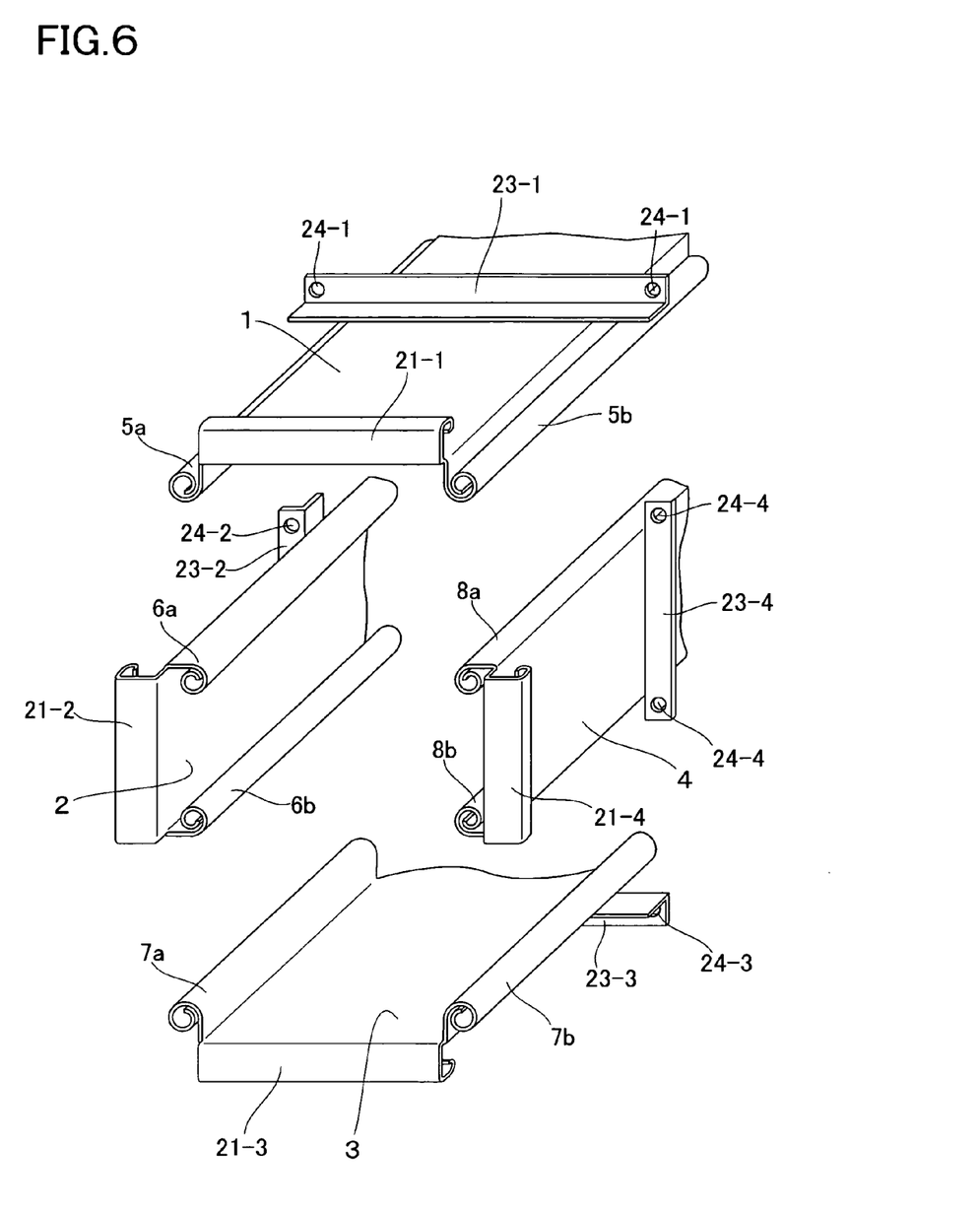
FIG. 6 is an exploded perspective view corresponding to FIG. 5.

Reinforcing flanges 23-1 to 23-4 formed of angle members are attached to intermediate portions of the outer peripheral surface of the wall portions 1 to 4 parallel to the connection flanges 21-1 to 21-4. Opposite end portions of each reinforcing flange 23 project from the two side edges of the wall portions 1 to 4. Bolt insertion holes 24-1 to 24-4 are formed in the projecting portions of the reinforcing flanges 23. Each adjacent pair of bolt insertion holes 24, e.g., the insertion holes 24-1 and 24-2 are positioned so as to be aligned with each other.

Figure 8A:
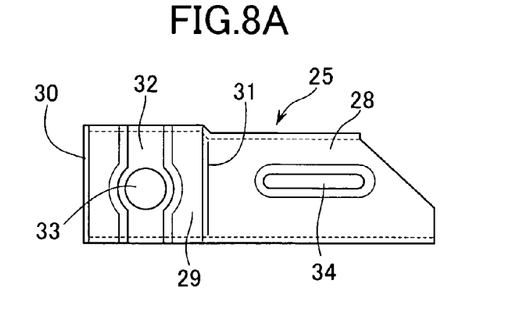
FIGS. 8(A), 8(B), and 8(C) are a plan view, a front view and a side view, respectively, of a first metal fitting.
Figure 8B:
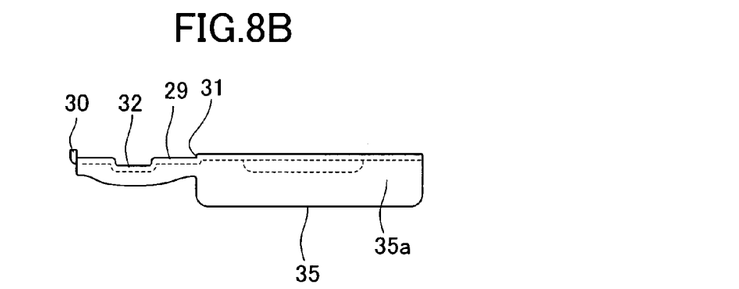
Figure 8C:
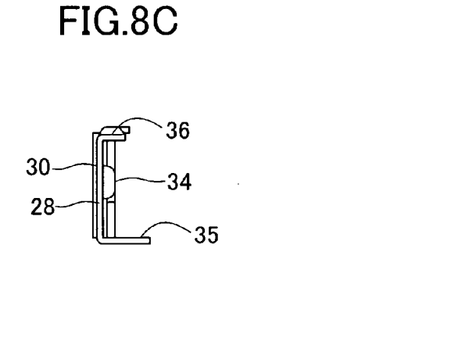
Figure 9A:
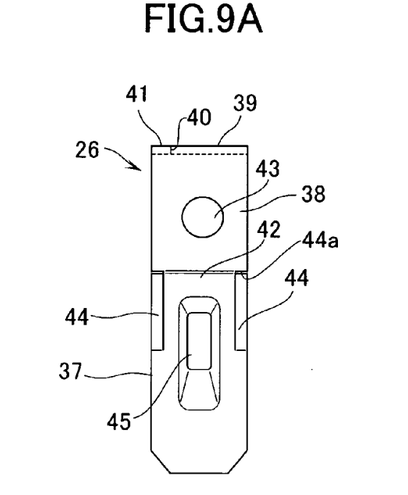
FIGS. 9(A), 9(B), and 9(C) are a plan view, a side view and another side view, respectively, of a second metal fitting.
Figure 9B:
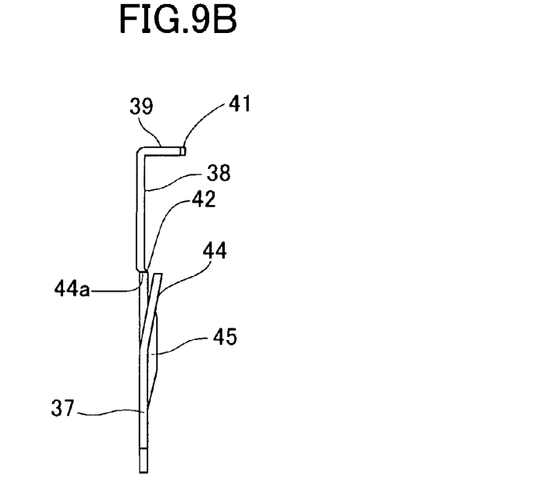
Figure 9C:
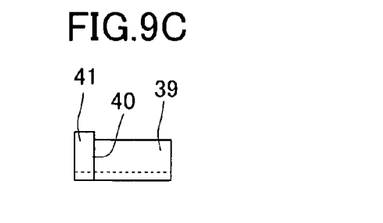
Figure 10A:
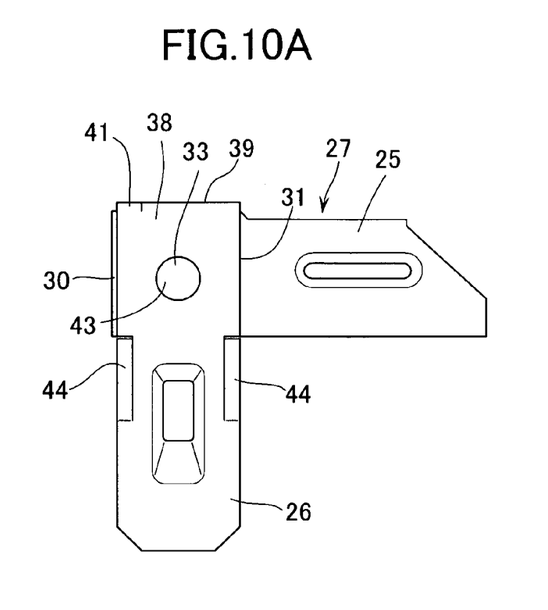
FIGS. 10(A), 10(B), and 10(C) are a plan view, a rear view and a side view, respectively, showing a state in which the first metal fitting and the second metal fitting are combined.
Figure 10B:
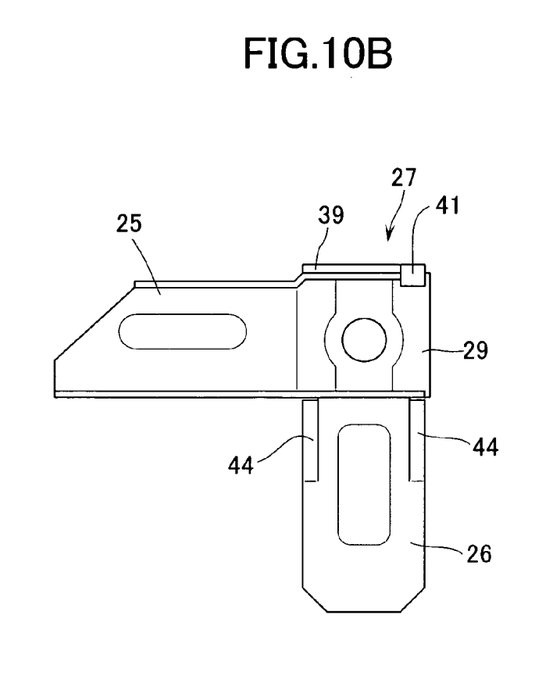
Figure 10C:
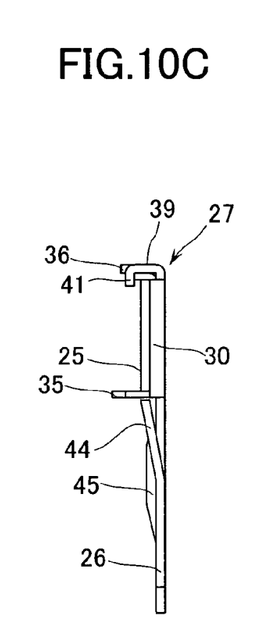

In the present invention, air-conditioning duct units B are transported by container transportation in a state of being changed in shape and flattened by being folded on the rotating shafts corresponding to the lock joints 9, as shown in FIG. 7, and are carried into a workplace. In the workplace, the duct units B are returned to the state in the form of the rectangular duct. Thereafter, first metal fittings 25 shown in FIG. 8 and second metal fittings 26 shown in FIG. 9 are attached to the opposite end portions of the connection flanges 21 in order to reinforce the corner portions of the duct units B. FIG. 10 shows a corner metal fitting 27 formed by perpendicularly combining the first metal fitting 25 and the second metal fitting 26.

After the corner metal fittings 27 have been fitted, bolts are passed through the bolt insertion holes 24, 24 formed in the opposite end portions of each reinforcing flange 23 and fastening using nuts is performed to connect each adjacent pair of reinforcing flanges 23.

The first metal fitting 25 has an inserted portion 28 and a receiving surface 29 on which an exposed portion of the second metal fitting 26 is seated. A bent portion 30 small in height is formed at one side end of the receiving surface 29, and a stepped portion 31 is formed by bending at the boundary between the other side end of the receiving surface 29 and the inserted portion 28. The receiving surface 29 in the form of a shallow recess is formed between the bent portion 30 and the stepped portion 31. A guide channel 32 extending in the widthwise direction is formed in an intermediate portion of the receiving surface 29, and a bolt hole 33 is formed at a center of the guide channel 32. An elongated protrusion 34 is formed in the inserted portion 28 by being extruded along the longitudinal direction. Reinforcing ribs 35 and 36 are formed by being bent in two side portions of the first metal fitting 25 along the longitudinal direction. The rib 35 is formed as a larger-width rib 35a on the inserted portion 28 side.

On the other hand, the second metal fitting 26 has an inserted portion 37 and a seated surface 38 to be seated on the above-described receiving surface 29. A bent portion 39 is formed at one side end of the seated surface 38, and is split by a slit 40 at a position closer to its one end to form an engaging claw 41 slightly longer than the bent portion 39. A small stepped portion 42 is provided at the boundary between the seated surface 38 and the inserted portion 37, and a bolt hole 43 is formed at a center of the seated surface 38. Slanted projections 44, 44 separated along cut lines 44a from a position in the vicinity of the stepped portion 42 are slantingly forced out on two sides of the inserted portion 37, and end portions of the slanted projections 44, 44 extend outwardly to form a stepped surface. An elongated protrusion 45 which is engaged with the above-described guide channel 32 is formed at a center of the inserted portion 37 by being extruded along the longitudinal direction. It is not always necessary to provide the above-described stepped portion 42, and the surface corresponding to the stepped portion 42 may be made flat.

When the above-described two metal fittings 25 and 26 are attached to the connection flanges 21, the inserted portion 28 of the first metal fitting 25 is inserted along the back surface of the end of one connection flange 21 with the receiving surface 29 of the first metal fitting 25 facing another duct unit to be connected, the larger-width rib 35a being positioned on the wall portion side, and the rib 36 being guided along the corresponding one of the side projections having the bent portions and facing the wall portions 1 to 4. Subsequently, the inserted portion 37 of the second metal fitting 26 is inserted along the back surface of the end of the other of the adjacent pair of flanges 21, with the elongated protrusion 45 side of the second metal fitting 26 facing the receiving surface 29 of the first metal fitting 25, the engaging claw 41 being set on the bent portion 30 side, and the protrusion 45 being guided in the guide channel 32. As the inserted portion 37 is inserted, the slanted surfaces of the slanted projections 44, 44 are brought into contact with the receiving surface 29 to bring the inserted portion 37 apart from the receiving surface 29, but the inserted portion 37 moves straight with opposite sides of the slanted projections 44, 44 guided along the bent portion 30 and the stepped portion 31. When the ends of the slanted projections 44 pass the end of the receiving surface 29, the seated surface 38 is brought into close contact with the receiving surface 29.

In this state, the bent portion 39 and the ends of the slanted projections 44, 44 positioned at the opposite sides of the seated surface 38 of the second metal fitting 26 contact the opposite side portions of the receiving surface 29 of the first metal fitting 25, and the opposite side portions of the seated surface 38 contact the bent portion 30 and the stepped portion 31 of the first metal fitting 25, so that the two metal fittings 25 and 26 cannot move in the longitudinal and widthwise directions and cannot rotate. Thereafter, the engaging claw 41 is bent to retain the rib 36 as shown in FIG. 10(C), thereby also stopping the metal fittings 25 and 26 from moving in the separating direction. It is noted here that each the first metal fitting 25 is attached to one end of each connection flange 21 while the second metal fitting 26 is attached to the other end.

While the engaging claw 41 is superposed on the rib 36 by being positioned on the bent portion 30 side, the second metal fitting 26 may be reversed in position so that the engaging claw 41 is positioned on the stepped portion 31 side. Also, the engaging claw 41 may be removed.

Figure 11A:
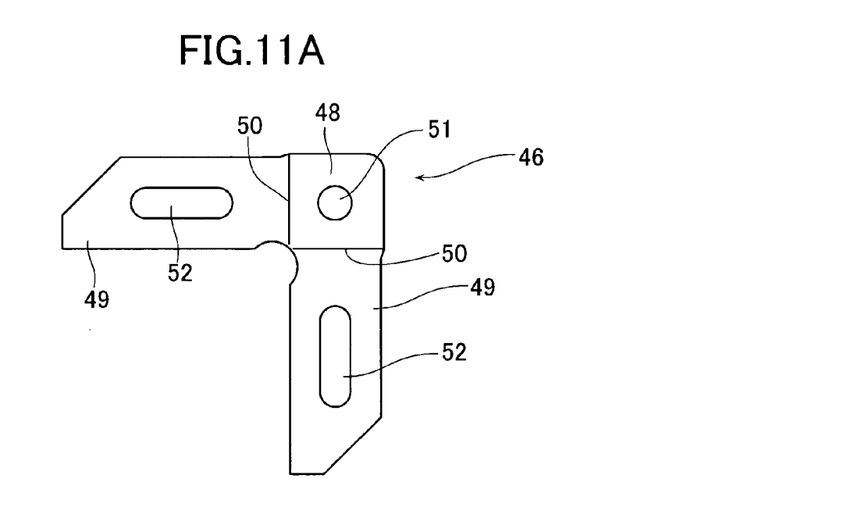
FIGS. 11(A) and 11(B) are a plan view and a side view of an L-shaped corner piece.
Figure 11B:
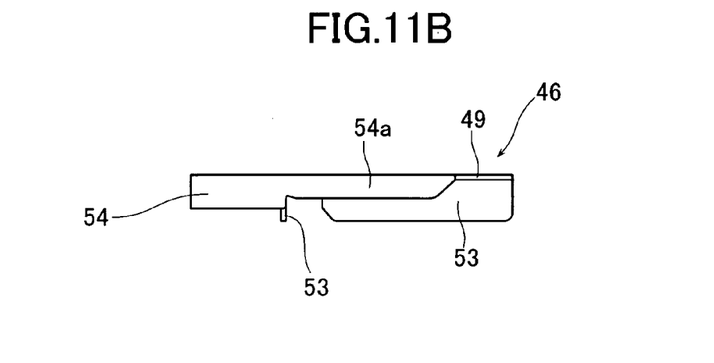
Figure 12:
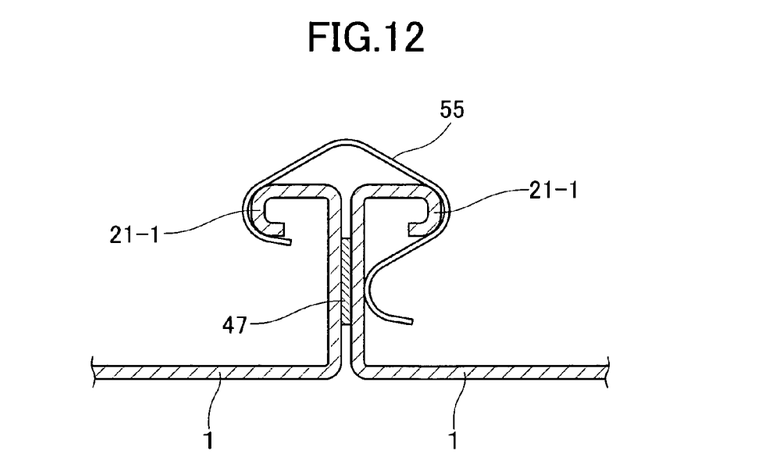
FIG. 12 is a cross-sectional view of a portion at a center in the longitudinal direction when the upper and lower connection flanges are connected to the connection flanges of an adjacent duct unit.

After each of the duct units B has been assembled as described above, the duct units B are connected one after another by the tee duct connection (TDC) method. More specifically, the connection flanges 21-1 to 21-4 of each adjacent pair of duct units B are superposed on each other; L-shaped corner pieces 46, 46 are fitted to four corner portions of the superposed connection flanges 21, 21 on the opposite sides of the flanges 21; and the flanges 21 are fasted to each other by using bolts and nuts, thereby connecting the duct units B, B. At this time, a gasket 47 is pinched between the entire peripheral portions of the connection flanges 21, 21 including the cut corners 22, 22 to ensure airtightness of the air-conditioning duct. Bolt insertion holes are also formed in the corner pieces 46 and the gasket 47 at positions corresponding the above-described bolt holes 33 and 43.

Each of the corner pieces 46 has a corner portion 48 which is square as viewed in plan, and side portions 49, 49 which extend from the corner portion 48 in directions perpendicular to each other and which are substantially identical in structure to each other. A stepped portion 50 is provided at the boundary between the corner portion 48 and the side portion 49. The flat surface of the corner portion 48 is slightly higher than the flat surfaces of the side portions 49. A bolt insertion hole 51 is formed at a center of the corner portion 48, and an elongated protrusion 52 for reinforcement is formed in each side portion 49 in the longitudinal direction by denting. Ribs 53 and 54 are formed by bending in inner and outer peripheral end portions of the corner piece 46 on the opposite sides in the widthwise directions. The rib 53 on the inner peripheral side is larger in width than the rib 54 on the outer peripheral side. The rib 54 is formed of a smaller-width rib 54a on the side portion 49 side. An outer peripheral corner portion of the corner piece 46 is rounded and an inner peripheral corner portion opposite from the outer peripheral corner portion is curved so as to have a circular-arc shape.

When one adjacent pair of duct units B are connected, each L-shaped corner piece 46 is positioned so that its front side faces opposite from the connection flange 21, and the outer peripheral ribs 54, 54 of the corner portion 48 are respectively brought into contact with the bent portion 30 of the first metal fitting 25 and the bent portion 39 of the second metal fitting 26. At this time, one inner peripheral rib 53 may be in contact with or at a distance from the large-width rib 35a of the first metal fitting 25. In this state, the duct units B are connected by inserting bolts in the bolt insertion holes 51 and fastening using nuts, with each other with the gasket 47 pinched between the entire peripheral portions of the connection flanges 21, 21.

Thereafter, central portions of the connection flanges 21-1 and 21-3 of the connected duct units B are clamped with a clamp 55 to further improve the effect of sealing between the connection flanges 21, 21.

The above-described operations are repeated to form an air-conditioning duct of a predetermined length. Since the duct unit B of the present invention is a semifinished product, the assembly of the duct by tee duct connection method can be carried out mainly by multi-skill workers and no skilled workers are required.

In the present invention, the lock joint sealing means and duct unit connection means for the duct units B and A can be replaced with each other as well as the spin locks (lock joints) and the connection flanges and reinforcing flange structures of the duct units B and A.

According to the present invention, spin locks are provided along two side edges of the wall portions, and each adjacent pair of spin locks are joined to form a rotatable lock joint. The air-conditioning duct unit has the wall portions linked to each other with the lock joint forming an axis of rotation and can therefore be folded into a flattened state. Therefore the duct unit can be transported after being made compact. In a workplace, the duct unit can be easily returned from the flattened state to the state in the form of a tube having a predetermined rectangular sectional shape.

Thus, according to the present invention, the capacity of the air-conditioning duct unit can be largely reduced to effectively reduce the cost of transportation by a truck and the cost of transport inside and outside a building and to thereby limit the cost of installation of the air-conditioning duct. Moreover, according to the present invention, the energy efficiency of truck transportation and lifting in high-rise buildings is improved, thereby also contributing to a reduction in the amount of carbon dioxide exhaust.

INDUSTRIAL APPLICABILITY

The air-conditioning duct unit of the present invention is used as a unit in an air supply duct and an air-return duct through which air is transported by means of an air conditioner, and as a unit in a duct through which at least one of introduction of outside air and exhaustion of room air is performed. The air-conditioning duct unit of the present invention is installed in the ceiling or under the floor of office buildings, apartments, factories, hospitals, hotels, etc., and is connected, for example, particularly by a flange connection method in angle flange connection methods and corner bolt connection methods using an elbow-type duct unit, an S-tube duct unit or the like if necessary to form a predetermined air-conditioning duct.

What is claimed is:

1. An air-conditioning duct unit characterized by comprising upper and lower wall portions and right and left wall portions formed of metal sheets, and characterized in that spin locks curved into a curled shape are provided on said four wall portions at two side edges of the wall portions along the longitudinal direction; the spin locks provided on each of the adjacent pairs of said wall portions are joined to each other to form a rotatable lock joint; and the entire duct unit can be changed in shape by the rotation of the spin locks to be flattened.

2. The duct unit according to claim 1, characterized in that connection flanges are formed on said wall portions with the connection flanges being perpendicularly bent from two side edges of said wall portions along the shorter-sided direction.

3. The duct unit according to claim 2, characterized in that said connection flanges are fastened to the connection flanges of another duct unit adjacent to said duct unit by using corner pieces which are attached to four corner portions and in which bolt insertion holes are formed, and flange retaining metal fittings.

4. The duct unit according to claim 1, characterized in that each of said spin locks has a flat portion perpendicularly bent from the side of said wall portion along the longitudinal direction, and a curved portion in a curled shape formed continuously from the flat portion.

5. The duct unit according to claim 1, characterized in that a cylindrical hollow gasket is fitted in said lock joint in the axial direction.

6. The duct unit according to claim 4, characterized in that a cylindrical hollow gasket is fitted in said lock joint in the axial direction.

7. The duct unit according to claim 1, characterized in that a reinforcing flange is attached to an intermediate portion of the outer peripheral surface of each of said wall portions along the longitudinal direction.

8. The duct unit according to claim 5, characterized in that a reinforcing flange is attached to an intermediate portion of the outer peripheral surface of each of said wall portions along the longitudinal direction.

9. The duct unit according to claim 1, characterized in that each of the pair of said upper and lower wall portions and the pair of said right and left wall portions are formed of members identical in size to each other and forming a symmetrical structure.

10. The duct unit according to claim 5, characterized in that each of the pair of said upper and lower wall portions and the pair of said right and left wall portions are formed of members identical in size to each other and forming a symmetrical structure.

* * * * *